(No Model.) 3 Sheets—Sheet 1.

L. GUTMANN.
ELECTRO MAGNETIC CUT-OUT.

No. 446,515. Patented Feb. 17, 1891.

Witnesses,
J. B. Muldaur
Nellie L. Pope

Inventor
Ludwig Gutmann
By his Attorney
Edward P. Thompson (No Model.) 3 Sheets—Sheet 2.

L. GUTMANN.
ELECTRO MAGNETIC CUT-OUT.

No. 446,515. Patented Feb. 17, 1891.

Witnesses
J. B. Muldaur.
Nellie L. Pope.

Inventor,
Ludwig Gutman
By his Attorney,
Edward P. Thompson (No Model.) 3 Sheets—Sheet 3.

L. GUTMANN.
ELECTRO MAGNETIC CUT-OUT.

No. 446,515. Patented Feb. 17, 1891.

Witnesses
Will A. Courtland
Nellie L. Pope

Inventor
Ludwig Gutmann
BY HIS ATTORNEY
Edward P. Thompson

UNITED STATES PATENT OFFICE.

LUDWIG GUTMANN, OF PITTSBURG, PENNSYLVANIA.

ELECTRO-MAGNETIC CUT-OUT.

SPECIFICATION forming part of Letters Patent No. 446,515, dated February 17, 1891.

Application filed February 4, 1890. Serial No. 339,175. (No model.)

*To all whom it may concern:*

Be it known that I, LUDWIG GUTMANN, a subject of the Emperor of Germany, and a resident of Pittsburg, county of Allegheny, and State of Pennsylvania, have invented certain new and useful Improvements in Electro-Magnetic Cut-Outs, (Case 39,) of which the following is a specification.

This electro-magnetic cut-out has for its purpose to automatically connect or disconnect a converter or motor or any other apparatus to or from the main line, but especially when in circuit with alternating, intermittent, or pulsating currents of high electro-motive force. Experiment shows that the loss due to the permanently-connected converters or motors when not in use, especially of large capacity and complete magnetic circuit, is considerable, and that therefore it is advisable to have safe means for disconnecting such apparatus when out of use. As directly handling a switch in the primary circuit, especially by those unacquainted with the art, is dangerous, this direct and automatically acting cut-out has been constructed so as to connect the apparatus to the supply or energizing circuit the moment that the domestic or distributing circuit is closed.

Figure 4:
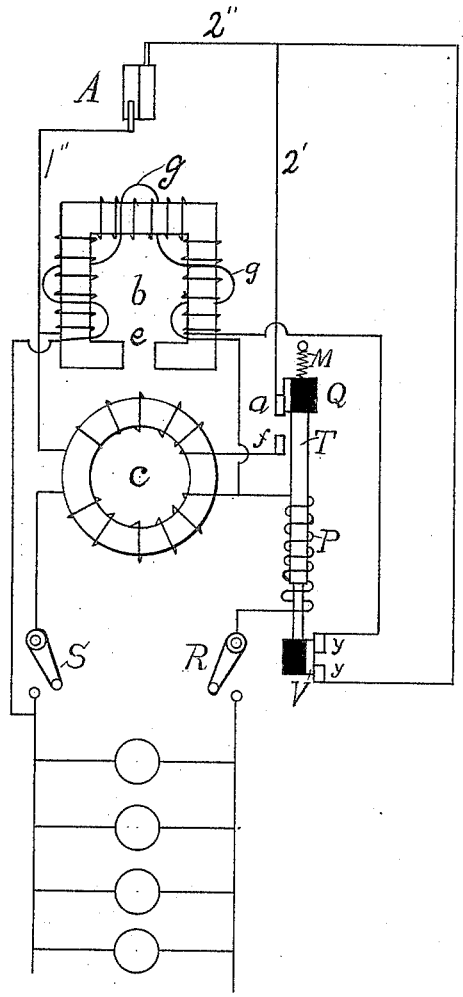
Figure 4A:
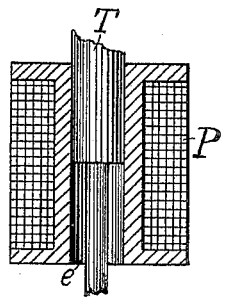

Referring to the drawings, Figures 1, 2, 3, 4, and 5 show the device in diagram in combination with the electric circuits, connections, and generators. Fig. 4ª shows the electro-magnet P, whose winding is on a larger scale. It consists of the combination of the apparatus to be used, such as a converter, and an electric, magnetic, or electro-magnetic device (an electro-magnet, for instance) in circuit with the energizing-circuit and at the same time in circuit with the converter.

Figures 1, 2, 3:
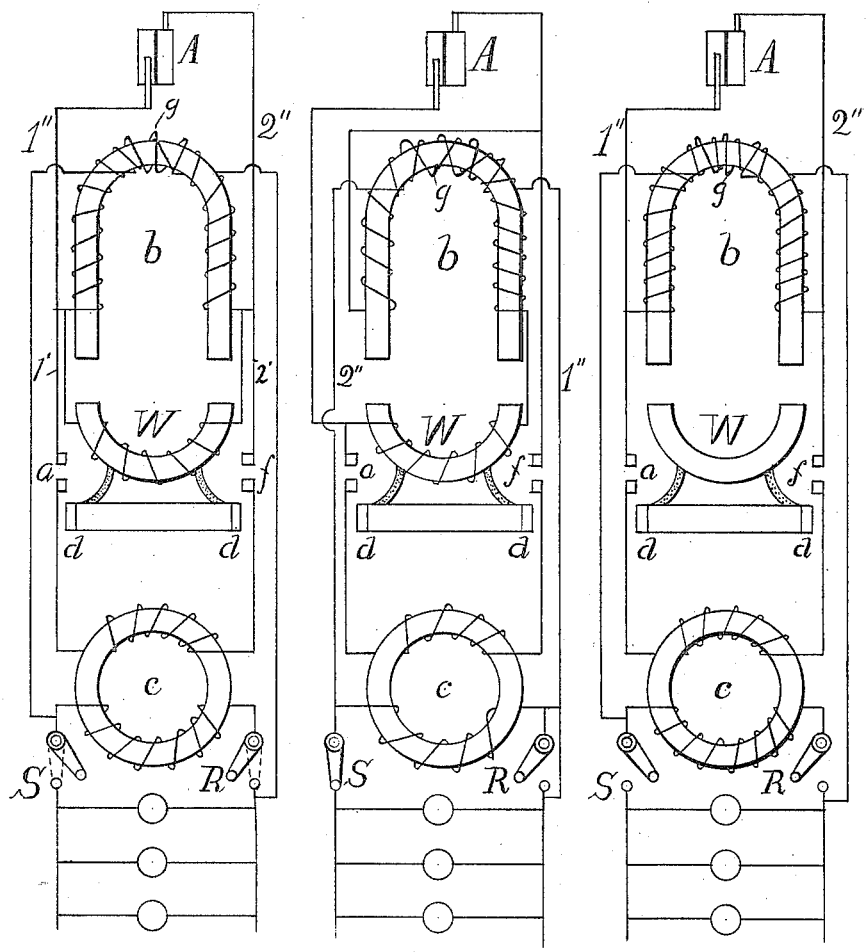

Referring to Fig. 1, the generator A is connected to the main line represented by the conductors 1″ and 2″, and the branch wires 1′ 2′, for connecting the converter $c$ to the main wires. These wires 1′ and 2′ are interrupted at $a$ and $f$, where an electro-magnetic cut-out is located to act as a switch. Magnet-coils $b$ and armature-coils W are shown in this figure connected in multiple arc and also connected to both poles of the generator A. A few turns of independent wire $g$ are wound on magnet $b$, (whose terminals are connected by wires 2″ and 1″.) As to wire $g$, the one terminal is connected below the switch R to the secondary circuit of converter $c$, and the other to the secondary at a point above the switch S. On opening the secondary circuit of converter $c$ the armature W is not attracted, the current ordinarily flowing (that is, when the converter $c$ is out of use) being not strong enough; but as soon as the secondary switches R and S, above alluded to and located in the secondary part of the converter-circuit, are closed a current will flow through 1″ 2″ and the independent wire or coil $g$. This current causes a stronger current to flow through the winding of the coils on magnets $b$ and armature W, and the said magnet is now powerful enough to attract the armature. This latter approaching toward the magnet $b$ carries with it the contact-points $d$, which close the open space between the two contacts $a$ and $f$ on each side of the armature W. As long as a lamp is used in the secondary circuit, so long will the armature remain attracted. An opening of the secondary circuit of converter $c$ by this arrangement will cause an instantaneous disconnection of the primary circuit of the converter.

Figure 5:
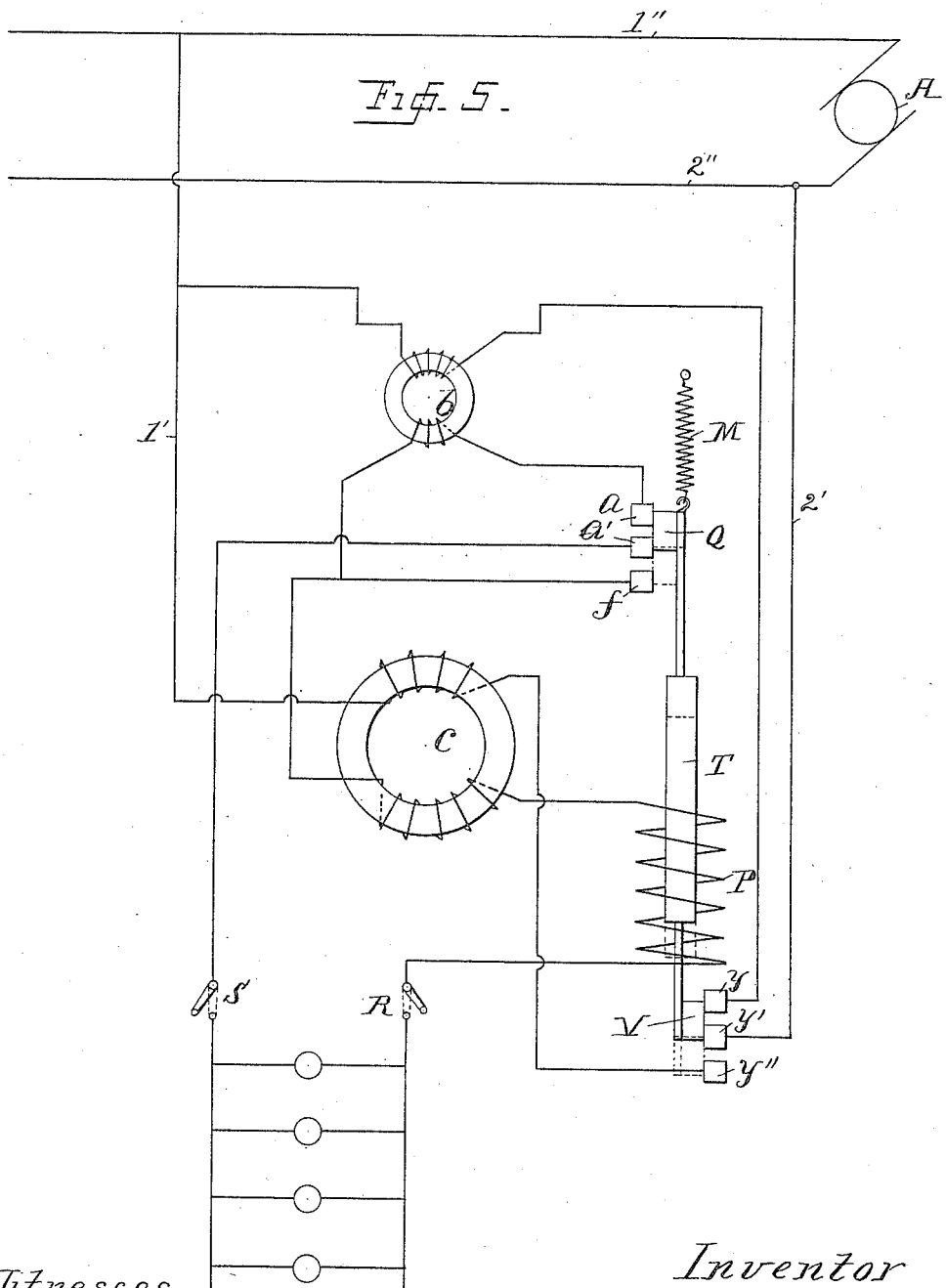

The electro-magnet $b$ and armature W, which remain constantly in circuit with the main line, can be considered as a small converter with an open magnetic circuit, which open magnetic circuit may have constantly the same resistance, as shown in Fig. 4, or may be variable, as shown in Figs. 1, 2, and 3; but of course the apparatus can have also a closed magnetic circuit, as shown in Fig. 5. This latter form is not so economical, however, as much energy is spent in heating the core. Fig. 2 is similar to Fig. 1, with the one difference of having the energizing-windings of magnet $b$ and armature W connected in series instead of in parallel. Fig. 3 is similar to Fig. 1, but shows no winding on the armature W. Fig. 4 shows another form of electro-magnet $b$ for a cut-out, with a small air-gap $e$ between its poles. In this case the switching is effected by an additional electro-magnet, the winding P of which forms part of the secondary circuit either in parallel or series, but preferably the latter, and may form part either of the winding of the electro-magnet *b* or of the converter *c*. The movable core of the additional magnet is suspended by a spring or any other yielding suspension or support and is provided with two contact-blocks Q and V. The exciting-coil of magnet *b* is interrupted in similar manner to that of the converter *c*, and this latter is connected to contacts *a f* and the former to *y y*. It will be noticed that the secondary circuit or wire is interrupted at the switch S; further, that the primary wire of converter *c* is interrupted at *a f*, and that the exciting-winding of magnet *b* is completed at the points *y y*. As soon as the switch S is closed the electro-magnet *b* performs for an instant the duties of the converter *c*. The exciting-current in the coil round *b* is increased in strength owing to the closing of the secondary. This causes the attraction of the core T, thereby closing the primary circuit of the converter *c*, while at the same time the exciting-circuit of the magnet is interrupted. The core will remain attracted as the current in the secondary circuit is maintained, and as long as there are lamps burning the magnet will keep the primary circuit of the converter closed. To reduce the waste of power the electro-magnet *b* is cut out of the circuit as long as the converter is in use. The cutting out of the electro-magnet is here shown only in the primary circuit; but it is evident that in a similar manner the secondary coil of the magnet can be excluded from the circuit. This is shown in Fig. 5. It is preferable to cut out or disconnect the secondary winding of the magnet *b*, as it would either be constantly in the work-circuit or else short-circuited upon itself. This latter result can only then be accomplished with good result when the energizing-winding of the magnet *b* is placed in series connection with the primary of the converter *c*.

In Fig. 5 the magnet *b* is shown connected in parallel to the converter *c* as regards their energizing-windings, both of which are electrically connected to the generator A by means of circuit-wires 1′ 2′ 1″ 2″, being permanently connected at 1′, while at 2′ they are connected to contact-blocks *y y′ y″*. The second winding of magnet *b* is connected with its ends to contact-blocks *a* and *f* and with one end at the same time with the secondary coil of converter *c*, which latter is also in connection with magnet-coil P and the work-circuit. As long as the switches R S are open the primary coil of converter *c* is open at *y″* while a current circulates through the energizing-winding of magnet *b* being closed by sliding contact V at the points *y y′*.

The position of the magnet T and contacts Q and V are as shown in the drawings, Fig. 5. As soon as the switches R S of the secondary circuit are closed, as indicated by dotted lines, the second winding on magnet *b* by induction will generate a current and supply the work-circuit and translating devices, such as lamps or motors, as shown. The circuit is completed as follows: Starting from contact-block *a*, the current flows over contact-slide Q to the second block *a′* to switch S, translating devices, switch R, coil P, secondary coil of converter *c* to the second end of the coil on magnet *b*. This current energizing the solenoid P attracts core T, which is shifted or drawn down to the position shown in dotted lines. The slide Q connects blocks *a′* and *f* in the secondary circuit, and slide V joins contact-blocks *y′* and *y″* together, while there is an interruption between *a* and *a′* and also between *y* and *y′*. The circuits are now closed through the primary and the secondary coils of the converter only, while both windings of magnet *b* are open. The magnet T remains in position as long as a lamp or motor is in circuit, while as soon as the last lamp is extinguished, or one or both switches are opened, the core T is released and forced into its original position by spring M or equivalent means.

In Fig. 5 the cut-out is shown to operate simultaneously several circuits—as, for instance, the primary circuits of two separate devices or primary and secondary of one device and the primary of a second device.

I do not desire to limit myself to the invention as shown in the diagram, as it is evident that when the cut-out is adapted to operate simultaneously two or three circuits it may be modified to operate four or more, and that instead of opening the primary or secondary circuit on one side only the cut-out may be constructed so as to open and close at the same time both sides or terminals of any circuit, as shown in Figs. 1, 2, and 3.

I claim as my invention—

1. In a system of electrical distribution, the combination of an electric generator, a main or supply circuit connected therewith, a translating device, such as a converter, whose primary or energizing coils are connected with said main circuit, an electro-magnetic cut-out interposed between the translating device and the main or supply circuit, and a secondary coil for said translating device in electric connection with a winding on said cut-out, for the purpose described.

2. In combination with the primary and secondary coils of an electric converter, a circuit-controller having two independent windings, one of which is in electric connection with the secondary coil of the said translating device, for the purpose described.

3. In a system of electrical distribution, the combination of an electric generator, a main line in circuit therewith, two converters whose primary coils are in circuit with said main line and whose secondary coils are in circuit with each other and with translating devices, such as lamps, a circuit-controller, such as a cut-out, in circuit with the primary coil of each converter, and automatic means, such as a magnet, located in circuit with the secondary coils of each converter, for opening and closing said cut-outs alternately, according to the amount of current in said secondary coil or coils.

4. In a system of electrical distribution, the combination of an electrical generator, two converters in circuit therewith, translating devices in circuit with the secondary of both converters, and means for automatically excluding and including the primary coil of the one converter with respect to the generator according to the amount of current in the secondary circuit of said converter, said means consisting of a double electric cut-out or circuit-breaking armature having two cut-outs whose coil is in circuit with the secondary coils of both converters, and in which the two cut-outs are respectively in circuit with the primary coils of both converters.

5. In a system of electrical distribution, the combination of an electrical generator of alternating, pulsating, or intermittent electric currents, a main line in circuit therewith and including the primary coil of an electric converter, translating devices, such as, for instance, electric lamps, in circuit with the secondary coil of said converter, an auxiliary converter whose primary coil is in circuit with said main line and whose secondary coil is in circuit with said lamps, a cut-out in circuit with the primary coil of each converter, and automatic means for opening said cut-out in the auxiliary converter and closing that in the said first converter upon a predetermined increase of current in the secondary coil of said auxiliary converter.

6. In a system of electrical distribution, the combination of a generator of alternating, pulsating, or intermittent currents, main lines in circuit therewith, including translating devices, such as converters, domestic or supply lines forming secondary circuits for said translating devices, an automatic circuit-controller interposed between translating devices and supply-circuit, having two or more windings independent of one another, and having one of its windings in electric connection with the secondary circuit of said translating devices, for the purpose described.

7. In a system of electrical distribution, the combination of a generator of alternating, pulsating, or intermittent currents, main lines in circuit therewith, translating devices, such as converters, in electric connection with said main lines, an electro-magnetic cut-out provided with two or more independent windings adapted to temporarily connect said translating devices to the main line, and having one of its windings forming a part of one of the circuits of the translating devices, for the purpose described.

In testimony that I claim the foregoing as my invention I have signed my name, in presence of two witnesses, this 27th day of December, 1889.

LUDWIG GUTMANN.

Witnesses:
ALICE E. GLOSSER,
J. W. SMITH.